United States Patent [19]
Evans

[11] 3,885,613
[45] May 27, 1975

[54] SELF-LOCKING FASTENER

[76] Inventor: Robert J. Evans, 1307 Porters Ln., Bloomfield Hills, Mich. 48013

[22] Filed: Feb. 5, 1973

[21] Appl. No.: 329,677

Related U.S. Application Data

[62] Division of Ser. No. 88,008, Nov. 9, 1970, Pat. No. 3,721,283.

[52] U.S. Cl. ................................................ 151/22
[51] Int. Cl. ........................................... F16b 39/30
[58] Field of Search ............ 151/22; 85/46; 10/10 R

[56] References Cited
UNITED STATES PATENTS

| | | | |
|---|---|---|---|
| 2,346,835 | 4/1944 | Green | 151/22 X |
| 3,196,918 | 7/1965 | Hampton | 151/22 |
| 3,721,283 | 3/1973 | Evans | 151/22 |

FOREIGN PATENTS OR APPLICATIONS

| 681,630 | 3/1964 | Canada | 151/22 |
|---|---|---|---|

Primary Examiner—Ramon S. Britts
Attorney, Agent, or Firm—Whittemore, Hulbert & Belknap

[57] ABSTRACT

A self-locking screw, one form of which is adapted to have root interference with a mating female thread. The root of the screw, on entry, displaces the crest material of the female thread into the voids between the flanks of the mating members. The screw has a swaging flank which, upon withdrawal, forces the displaced material back toward the crest of the female thread, thus reworking the female thread to approximately its original form.

In another form of the screw, the swaging flank is adapted to have positive interference with the confronting flank of the female thread upon entry in order to displace the flank material of the female thread to the crest thereof. A raised root forwardly of the swaging flank is adapted to interfere with the reworked female thread crest upon withdrawal.

A self-tapping self-locking screw having the swaging flank is also disclosed.

5 Claims, 13 Drawing Figures

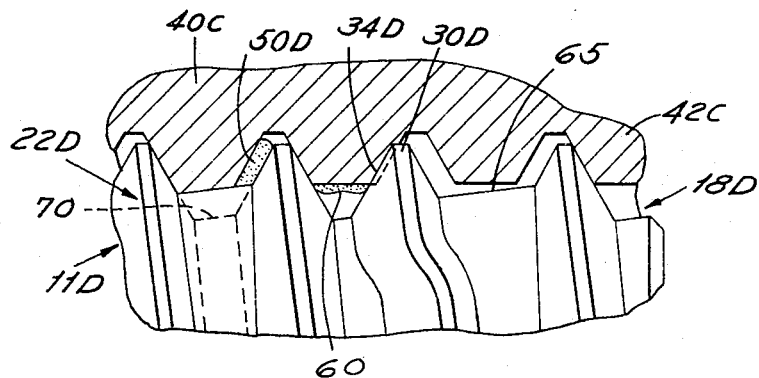
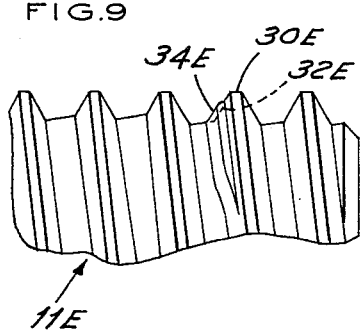
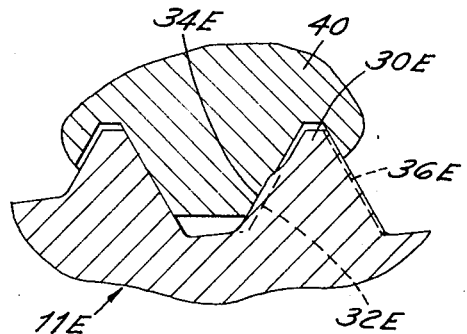
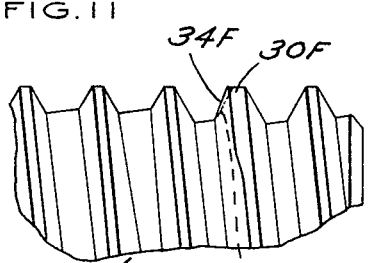
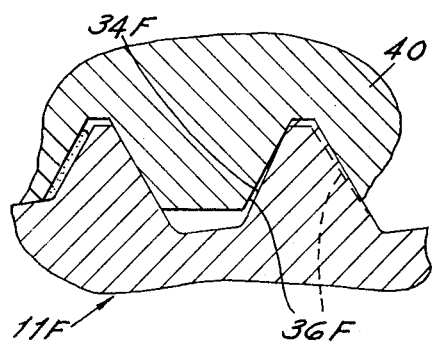
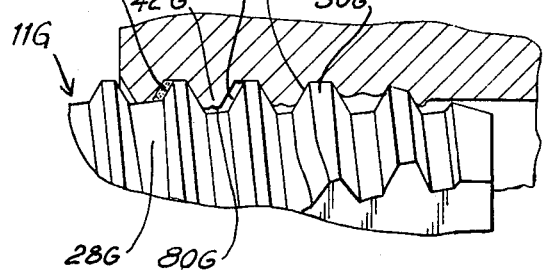

SELF-LOCKING FASTENER

REFERENCE TO RELATED APPLICATION

This application is a division of my copending application, Ser. No. 88,008, filed Nov. 9, 1970, now Patent No. 3,721,283.

BACKGROUND AND SUMMARY OF THE INVENTION

Self-locking screws have been used in which locking takes place on the root of the screw. The crest of the nut thread interferes with the screw root and is swaged and reworked as the screw enters so that the nut crest metal is forced into the voids between flanks of the mating members. While the static locking action of such screws is exceptionally good, the retention of prevailing removal torque on many disassemblies can be greatly increased by my invention which reworks the nut thread to an approximation of its preassembly form when removed.

Disclosed herein are fasteners having a specially placed and/or formed thread which, during disassembly of the mating parts, encounters the displaced metal on one of the flanks of the distorted nut member, creating a prevailing removal torque which may be independent of, or supplemental to, that prevailing removal torque derived from root interference and, in so doing, forces the metal between the flanks to return in the direction of the nut crest so that the nut thread is reworked to an approximation of its original preassembly form. Thus, on reassembly with the original screw (or one like it) root interference and a safe level of prevailing torque will be assured over many more insertions and removals.

Also disclosed is a screw for use in a nut having a standard pretapped hole in which the minor diameter of the nut exceeds the minor diameter of the screw, the screw having a specially placed and/or formed starting thread which, during initial entry, displaces metal from one of the flanks of the standard nut, forcing the displaced metal inwardly toward the crest thereof. The reworked crest metal may or may not interfere with the screw root, depending upon the depth of the root. A raised screw root, near the entering end of the screw, may be provided to interfere with the reworked female thread crest upon withdrawal.

A specially formed and/or placed thread may also be used in a self-tapping screw.

It is a primary object of this invention to provide a self-locking screw which is capable of maintaining prevailing removal torque at a high level over many more removals than has been possible heretofore.

Another object is to provide a self-locking screw having means for re-forming the nut crest to approximately its original form upon withdrawal of the screw.

Another object is to provide a self-locking screw having superior reassembly, interchangeability and service characteristics.

Another object is to provide a self-locking screw which is better suited for use as an adjusting screw.

Another object is to provide a self-locking screw having greatly increased reliability, especially in the field of public safety.

Another object is to provide an improved self-tapping self-locking screw.

Other objects and features of the invention will become apparent as the description proceeds, especially when taken in conjunction with the accompanying drawings wherein:

FIG. 8 is similar to FIG. 7 but shows a screw having another form of modified thread shown during entry into a nut thread like that in FIG. 7.

FIG. 9 is a fragmentary view of a screw having still another thread form.

FIG. 10 is an enlarged fragmentary view showing a screw having the thread form of FIG. 9 during removal from a mating thread.

FIG. 11 is a fragmentary view of a screw having still another thread form.

FIG. 12 is an enlarged fragmentary view showing a screw having the thread form of FIG. 11 during entry into a mating thread.

FIG. 13 illustrates a screw having another form of modified thread for self-tapping, shown partially assembled in a cored hole.

Figure 1:
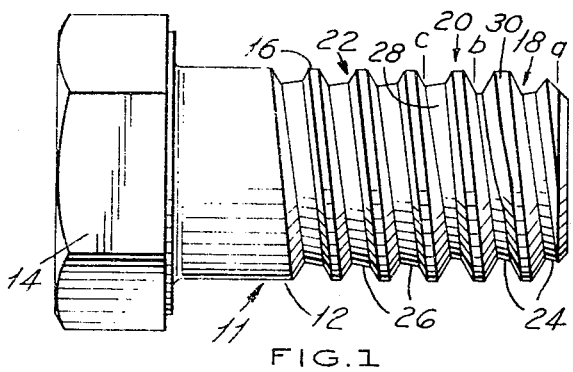
FIG. 1 is an elevational view of a screw embodying my invention.

Referring now more particularly to the drawings and especially to FIGS. 1 to 4, a self-locking screw embodying my invention is generally designated 11. This screw comprises a threaded (preferably roll threaded) shank 12 and may have a head 14 at one end.

The thread on the screw is a continuous helical male thread 16. The thread has a starting portion indicated at 18 between the lines $a$ and $b$, a ramp portion 20 between lines $b$ and $c$, and a body portion 22 to the left of the line $c$.

The starting portion 18 will ordinarily consist of one or more convolutions or turns of the thread. The ramp portion 20 will preferably extend from one-third to one full convolution. The main body portion 22 is usually made up of several convolutions of thread (actually it can if desired be very short).

The major diameter of the thread 16 throughout the starting, ramp, and main body portions is preferably substantially uniform. However, the diameter at the roots 24 in the starting portion 18 is reduced relative to the diameter of the roots 26 in the main body portion 22 in order to freely enter a pretapped hole as described more fully hereinafter. The root 28 of the ramp portion is of gradually increasing diameter, that is it gradually rises from the root of the starting portion to the root of the main body portion so as to connect the two along a smooth incline. The entire root of the screw is preferably inclined radially outwardly in a direction toward the entering end, although within the scope of this invention it does not have to be.

Figure 3:
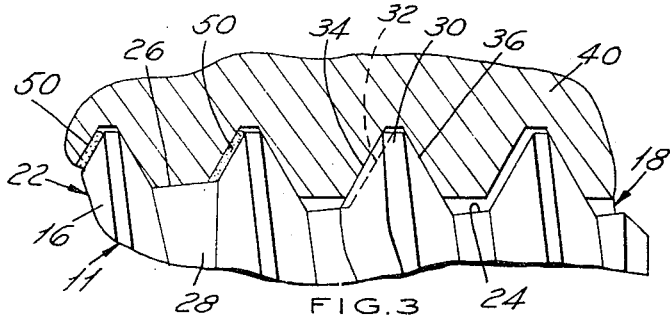
FIG. 3 is an enlarged fragmentary view of a portion of FIG. 2.

The starting portion 18 of the thread includes a modified thread portion designated 30 which is of relatively wider form as shown and extends for at least a portion of a convolution. This modified thread portion 30 is best seen in FIG. 3 in which the dotted line 32 indicates the unmodified starting thread form. The thread portion 30 is modified by a thickening of the base, that is by a shift of the flank 34 toward the head end of the screw (toward the left in FIG. 3), thus widening the thread form at the crest while narrowing it at the root. The opposite flank 36 of the modified thread portion 30 is unchanged. This modified thread flank 34 is sometimes hereinafter referred to as a swaging flank.

The space between confronting flanks in this instance is substantially uniform, with the exception that the space between the swaging flank 34 and its confronting flank is reduced.

Figure 2:
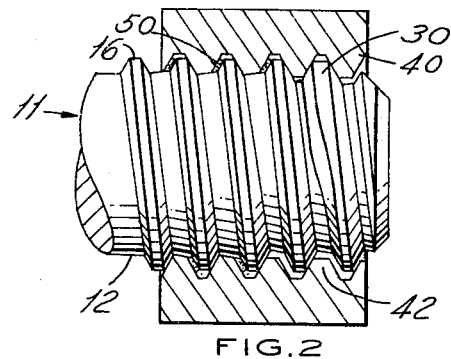
FIG. 2 is a fragmentary elevational view of the screw of FIG. 1 shown partly assembled in a nut thread which initially has a minor diameter less than the minor diameter of the screw in its body portion.
Figure 4:
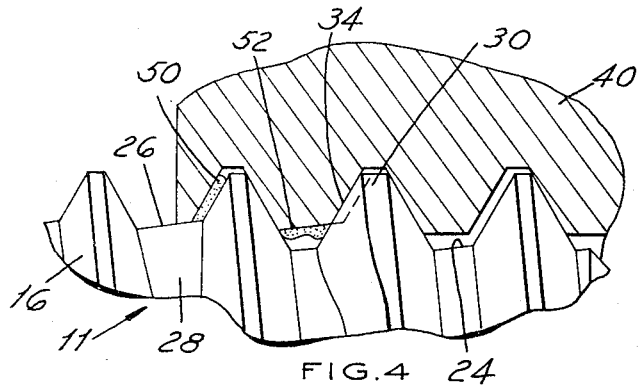
FIG. 4 is similar to FIG. 3 but shows the mating members after the screw has been partially withdrawn.

A nut 40 is shown in FIGS. 2-4 in threaded engagement with the screw 11. The nut 40 has a continuous helical female thread 42. The thread 42 is of uniform major and minor diameter throughout its length. The initial form of the thread 42 before assembly with the screw is illustrated in the three convolutions to the right in FIG. 3. The leftmost convolution of thread 42 in FIG. 3 has been swaged by the root of the screw. The initial minor diameter of the internal thread 42 prior to the insertion of the screw is less than the minor diameter of the screw in the main body portion 22 thereof, but greater than the minor diameter of the screw in the starting portion 18, as clearly shown in FIG. 3.

The width of the internal thread groove between convolutions is greater than the width of the screw thread 16 to provide flank clearance except where the starting portion of the thread is modified at 30. This modified portion of the male thread is of substantially the same width as the groove, preferably with no interference although a transition fit may occur.

On assembly, and with reference to FIG. 3, the starting portion 18 of the screw thread will readily start in the nut thread 42 without root interference. Upon further insertion, the root 28 in the ramp portion of the screw thread, which is of gradually increasing diameter, will contact and begin to swage and compact the softer crest material of the nut thread into the flank space between threads, as indicated at 50. Actually, when reference is made to the swaging of crest metal into the flank space, it should be understood that there may be only a general distortion of the nut thread, represented at 50, resulting from the compacting of the crest. Upon still further insertion, the root 26 in the main body portion interferes with and locks on the crest of the nut thread. The swaging flank 34 of the modified thread portion 30 enters the nut thread upon insertion of the screw with little or no interference.

It will be apparent that the screw is locked in assembly with the nut thread on the minor diameter by the interfering contact between the crest of the nut thread and the root of the screw and to a certain extent, depending on placement of the swaging flank, by the compaction of displaced material against the swaging flank.

On removal, and with reference to FIG. 4, the swaging flank 34 of the screw will interfere with the material 50 displaced from the nut thread crest into the flank clearance between threads, and will force or displace such material back toward the nut crest. Such reworked material forced back to the nut crest is indicated at 52 in FIG. 4. There is of course screw root clearance at the base of the swaging flank 34 to accommodate the material 52 forced back to the nut crest. Thus upon removal of the screw the swaging flank 34 in effect reworks and re-forms the nut thread to an approximation of its original minor diameter and while doing so produces a prevailing removal torque which is either supplemental or additive to that which occurs as a result of any screw root and nut crest interference. Then upon reinsertion of the screw, there is sufficient metal on the crest of the nut thread to provide a locking root interference with the screw root in the main body portion and insure a strong locking action.

Upon withdrawal of the screw, the swaging flank 34 re-forms or reworks the nut crest so that there is enough material at the crest for root locking to take place on the next insertion. The swaging flank thus substantially increases the number of times the screw can be inserted and withdrawn without serious reduction in prevailing removal torque. The effort required to rework the nut crest by the swaging flank 34 when the screw is removed itself produces prevailing removal torque.

Figure 5:
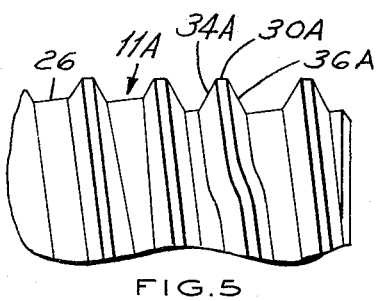
FIG. 5 is a fragmentary view of a screw having a thread modified in a different manner.

FIG. 5 shows a screw 11A which differs from the screw 11 only in the modified thread portion 30A. In FIG. 5, the thread portion 30A is modified by a change in pitch or lead, that is by a displacement or shifting of the modified thread portion 30A in its entirety toward the head end of the screw (toward the left in FIG. 5). Thus the pressure of swaging flank 34A is the same as the swaging flank 34 in FIGS. 1 to 4 in form and location, but the remainder of the modified thread form 30A including its crest and opposite flank 36A are displaced toward the head end of the screw. The contour of the modified thread portion 30A is the same as the thread contour in the remainder of the starting portion, the portion 30A being modified only by an offset in pitch or lead.

It will be clear therefore that the swaging flank 34A will have substantially the same reworking and re-forming action upon the nut thread 42 upon removal as the swaging flank 34 in FIGS. 1 to 4. However, by reason of the offset of the flank 36A, there will be a clearance along this flank so that the modified thread portion 30A may flex resiliently and thus enhance the prevailing torque characteristics. This is because the clearance along flank 36A will permit deflection of the modified thread portion 30A both during assembly and disassembly. The feature of resilient deflection is especially advantageous where the root form of the screw is inclined radially outwardly as indicated by the root 26 in a direction toward the entering end of the screw to add a wedging action to the root lock.

Figure 6:
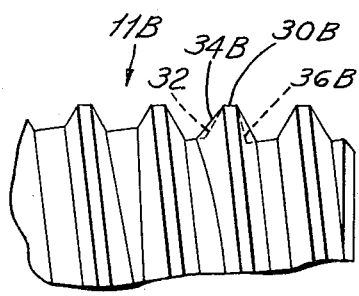
FIG. 6 is a fragmentary view of a screw having still another form of modified thread.

FIG. 6 illustrates a screw 11B which has a thread form like the screw 11, differing only in the modified thread portions 30B. The contour of the thread in the modified portion 30B differs from that of screw 11 only in the shape or form of the swaging flank 34B. As in FIG. 3, the dotted line 32 in FIG. 6 illustrates the unmodified starting thread form at the pressure flank. The pressure or swaging flank 34B is modified to the extent that its half angle, measured from the crest in this case, is increased or made larger than that of the unmodified starting thread flank contour. Accordingly, the modified thread form 30B is thickened or made wider at the root, but has the same crest width. This swaging flank 34B will interfere with the displaced metal 50 between flanks when screw 11B is removed from the nut thread 42, producing a similar reworking and re-forming of the nut thread, as was the case with screw 11.

FIG. 6 shows a further possible modification in which the opposite flank 36B may be shifted from the position shown in solid lines to the position in dotted lines so as to have a reduced half angle measured from the crest. Such a modification of the opposite flank 36B would produce a flank clearance or void when installed in the nut thread 42, having the advantage of resiliency referred to in connection with the embodiment of FIG. 5.

Figure 7:
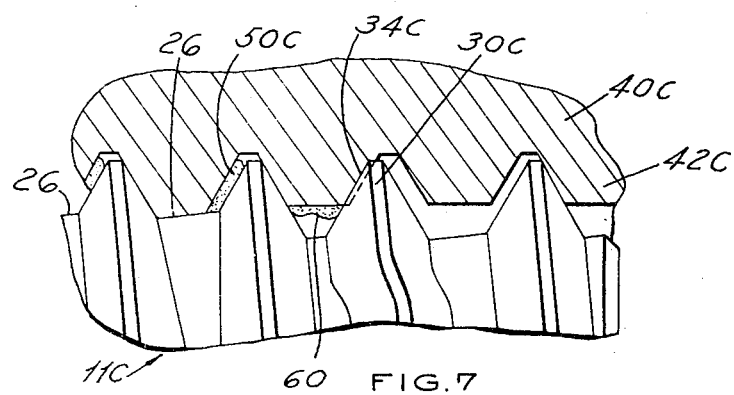
FIG. 7 is a fragmentary view showing a screw having another form of modified thread shown during entry into a nut thread having an initial minor diameter greater than the minor diameter of the screw.

FIG. 7 illustrates a screw 11C assembled in a nut 40C. The nut 40C differs from the nut 40 only in that its thread 42C initially has a minor diameter which is larger than the minor diameter of the screw 11C even in its body portion where indicated at 26. Screw 11C is like the screw 11A except that the modified thread portion 30C has an even greater pitch offset than the modified thread portion 30A. Except for the amount of offset the modified thread portion 30C is the same as the modified thread portion 30A. As shown, the modified thread portion 30C is offset an amount sufficient to cause its swaging flank 34C to have positive interference with the confronting flank of the thread of nut 40C upon assembly therewith.

FIG. 7 shows screw 11C being inserted into nut 40C. Upon insertion, the swaging flank 34C will positively interfere with the confronting flank of the nut thread, displacing the flank material of the nut thread out to the crest where indicated at 60. The reworked crest, by virtue of the displaced material 60, now has a smaller diameter than the root 26 so that upon further insertion of the screw the material on the reworked nut crest is displaced by the screw root 26 into the flank clearance where such material is indicated at 50C. The screw 11C thus is locked in assembly by the interfering contact of the nut thread, and also by the interfering contact of the swaging flank 34C with the confronting flank of the nut thread.

Upon withdrawal of the screw 11C, the swaging flank 34C will displace or force the material 50C between flanks back to the crest of the nut thread to thus rework and reform the nut crest to an approximation of its initial form. The interference of the flank 34C with the material 50C of the nut during removal increases the prevailing removal torque of the screw.

Screw 11C will thus be seen to be able to lock in over-sized nuts such as 40C. Screw 11C will of course thread into and lock with a nut 40 whose minor diameter is less than the minor diameter of screw 11C in the body portion at 26 but greater than that on the starting portion.

FIG. 8 illustrates a screw 11D which is like screw 11C except that its starting portion 18D in advance of the modified thread form 30D has a root 65 of greater diameter than that portion of the root rearwardly thereof. Screw 11D is shown assembled with the nut 40C and it will be noted that the diameter at the root at 65 in the starting portion, while increased, is still less than the initial minor diameter of the nut thread 42C prior to assembly. During installation of the screw 11D, the action is the same as that described in connection with screw 11C in FIG. 7, first building up crest metal at 60 and then displacing the built up crest metal into the flank space as shown at 50D. During insertion, the thread root 65 performs no function.

Upon withdrawal of the screw 11D, the swaging flank 34D has the same reworking and re-forming action on the nut thread described in FIG. 7, but the material thus restored to the nut crest at the base of the swaging flank 34D is engaged and compacted by the interfering engagement therewith of the modified root 65. Thus the modified root 65 adds an element of prevailing removal torque helping to retain the assembly.

The dotted lines 70 in FIG. 8 show a modified thread root form in the body portion 22D of the screw which is reduced to the extent that obviously there would be no root lock at this point when assembled with the nut 40C. However, withdrawal of the screw 11D as thus modified would be resisted by the combined prevailing action of the flank 34D and the subsequent positive locking action of the modified root 65 upon the re-formed nut crest shown at 60.

FIGS. 9 and 10 illustrate a screw 11E which is like screw 11 except for the form of the modified thread portion 30E. The swaging flank 34E is offset with respect to the unmodified starting thread form (shown in dotted lines at 32E), from the root out only to about half, for example, the extent of the flank. The outer part of the modified flank 34E is not offset. Hence the swaging effect of the flank 34E upon the confronting nut flank during withdrawal from nut 40, as shown in FIG. 10, will be limited more or less to that portion of the confronting nut thread flank adjacent to its crest. It is understood that the swaging flank may be set at a lesser angle to the screw axis than shown in FIGS. 9 and 10.

There is an advantage in maintaining the void in the upper portion to allow for displacement of material from the flanks, should they interfere, or if plating material is displaced in a very close fit. Furthermore, the level of prevailing drag torque on initial assembly would desirably be less when a void is provided.

The dotted line 36E in FIG. 10 illustrates a further modification in which the opposite flank of the modified thread portion 34E is moved toward the head end of the screw (to the left in FIG. 10) to provide a flank clearance so that the modified thread 34E may be resilient and flexed somewhat when assembled with nut 40 for the purpose referred to above in connection with FIG. 5.

FIG. 11 shows a modified screw 11F which is like screw 11 except for the modified thread portion 30F. Thread portion 30F is like thread portion 30 except for the form of its swaging flank 34F. The unmodified starting thread form at the swaging flank is shown in dotted lines at 32F. Thus the modified flank 34F has a flank angle as measured at the base greater than that of the unmodified form. The width of the crest in FIG. 11 is thereby increased so that during assembly as shown in FIG. 12 with nut 40 the void between the flank 34F and the opposing nut flank is reduced. The swaging flank 34F will, upon removal, have the re-forming and reworking action on the nut thread more or less as described hereinabove. Referring further to FIG. 12, the dotted line 36F indicates a further modification by decreasing the angle of the opposite flank as measured at the base in order to reduce the assembly drag torque which may be contributed by the modified thread.

The screw whish is the subject of this invention may, when provided with a properly constructed entering end, be used as a chipless or cutting self-tapping fastener for use in a hole cored in relatively ductile material. Such a screw will have a locking action additive to that prevailing locking which results solely from the compressive annular forces which may be directed against the root of the screw by the newly formed nut thread. Such a screw is illustrated as chipless in FIG. 13 in partial assembly with a cored hole. The screw designated 11G in FIG. 13, is like the screw in FIG. 3 and has a modified thread 30G like the modified thread 30 in FIG. 3. The modified thread 30G has a swaging flank 34G similar to the swaging flank 34 in FIG. 3, placed near the entering end of the screw which will be seen to be tapered and to have angularly spaced flats to form the nut thread by a chipless swaging action as it enters the cored hole.

On entering, the modified thread 30G of the screw in FIG. 13 will form a thread groove of the same general form as itself, so as to be broader than and/or out of lead with the others. On further entering, it will be seen that a void exists to the left of the swaging flank 34G, between the flank of the normal or unmodified thread of the screw and the newly formed nut thread 42G. On still further entry, the ramp 28G, which is like the ramp 28 in FIG. 3, contacts the newly formed material 80G at the crest of the nut, forcing it to return into the void as shown at 50G.

On removal of the screw, the displaced metal 50G will be engaged by the swaging flank 34G and forced to return to the nut crest, producing additional prevailing removal torque. Depending on ductility, subsequent assemblies and removals will remain at a higher level of prevailing removal torque as a result of the interaction between the swaging flank and root.

While the modified thread is shown displaced to the load side in the foregoing embodiments, it could in certain fasteners be displaced to the opposite side. It will also be understood that the modified thread could in certain fasteners be placed farther back from the entering end with root locking elements on both sides.

What I claim as my invention is:

1. A self-locking male member having a generally helical male thread, a female member having a generally helical preformed female thread mating with said male thread, said male thread having in at least a partial convolution adjacent its entering end a swaging flank portion which is modified relative to the corresponding flank portions of convolutions of said male thread more remote from said entering end by being offset toward the flank portion which it confronts and hence spaced therefrom a distance less than the distance between confronting flank portions of said more remote convolutions, said swaging flank portion being offset sufficiently to have positive interference with the opposing flanks of said female thread upon entry of said male member and to displace such opposing flank material toward the crest of said female thread, the root of said male thread in said more remote convolutions and at the base of said swaging flank portion being sufficiently less in diameter prior to assembly than the crest of said female thread that in assembly there is a clearance between said crest of said female thread and said root of said male thread in said more remote convolutions and at the base of said swaging flank portion for the receipt of such displaced material, said male member having a raised root forwardly of said swaging flank portion which is of greater diameter than the root of said male thread in said more remote convolutions and at the base of said swaging flank portion adapted, upon withdrawal of said male member, to swage said displaced female thread material back along the flanks of said female thread.

2. A self-locking screw having a generally helical male thread, said screw being adapted to threadedly engage a female thread initially having a minor diameter greater than the minor diameter of said screw, said screw having in at least a partial convolution adjacent its entering end a swaging flank portion which is modified relative to the corresponding flank portions of convolutions more remote from said entering end by being offset toward the flank portion which it confronts and hence spaced therefrom a distance less than the distance between confronting flank portions of said more remote convolutions, said swaging flank portion being offset sufficiently to have positive interference with the opposing flanks of such female thread upon entry of said screw and to displace such opposing flank material toward the crest of such female thread, said screw having a raised root forwardly of said swaging flank portion which is of greater diameter than the root at the base of said swaging flank portion adapted, upon withdrawal of said screw, to swage material displaced toward the crest of such female thread back along the flanks thereof.

3. A self-tapping self-locking screw having a generally helical male thread, said screw having interfering convolutions spaced from the entering end formed with an axially inclined truncated root being free of protuberances, said axially inclined root defining portions of maximum and minimum diameter, said screw having an entering end adapted to form a female thread in a cored hole and being self-locking by root interference in said intefering convolutions with the crest of the newly formed female thread, said screw having in at least a partial convolution adjacent its entering end a swaging flank portion along the flank thereof adjacent the inclined root portion of maximum diameter, said swaging flank portion being modified relative to the corresponding flank portions of said interfering convolutions by being offset toward the flank portion which it confronts and hence spaced therefrom a distance less than the distance between confronting flank portions of said interfering convolutions, said swaging flank portion being operative, upon entry of said screw, to form a flank clearance with the female thread for the reception of material displaced from the crest of the female thread by said root inteference, said swaging flank portion being operative, upon withdrawal of said screw, to swage the material displaced from the crest of the female thread back toward such crest.

4. The self-tapping self-locking screw defined in claim 3, wherein said partial convolution is wider between flanks than said interfering convolutions.

5. A self-tapping self-locking screw having a generally helical male thread, said screw having interfering convolutions spaced from the entering end, said screw having an entering end adapted to form a female thread in a cored hole and being self-locking by root inteference in said interfering convolutions with the crest of the newly formed female thread, said screw having a swaging flank portion in at least a partial convolution adjacent its entering end, said swaging flank portion being modified relative to the corresponding flank portions of said interfering convolutions by being offset toward the flank portion which it confronts and hence spaced therefrom a distance less than the distance between confronting flank portions of said interfering convolutions, said swaging flank portion being operative, upon entry of said screw, to form a flank clearance with the female thread for the reception of material displaced from the crest of the female thread by said root interference, said swaging flank portion being operative, upon withdrawal of said screw, to swage the material displaced from the crest of the female thread back toward such crest.

* * * * *